(12) United States Patent
Moyal et al.

(10) Patent No.: US 11,714,702 B1
(45) Date of Patent: Aug. 1, 2023

(54) DEVICE UNDERPERFORMANCE IDENTIFICATION AND SOLUTION

(71) Applicant: INTERNATIONAL BUSINESS MACHINES CORPORATION, Armonk, NY (US)

(72) Inventors: Shailendra Moyal, Pune (IN); Venkata Vara Prasad Karri, Visakhapatnam (IN); Sarbajit K. Rakshit, Kolkata (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 17/650,535

(22) Filed: Feb. 10, 2022

(51) Int. Cl.
  *G06F 11/07* (2006.01)
  *G05B 23/02* (2006.01)

(52) U.S. Cl.
  CPC ...... *G06F 11/0793* (2013.01); *G05B 23/0275* (2013.01); *G06F 11/0706* (2013.01); *G06F 11/079* (2013.01); *G06F 11/0754* (2013.01)

(58) Field of Classification Search
  CPC ............. G05B 23/0275; G06F 11/0706; G06F 11/0754; G06F 11/079; G06F 11/0793; G06F 11/3058
  See application file for complete search history.

(56) References Cited

U.S. PATENT DOCUMENTS

| | | | |
|---|---|---|---|
| 8,812,157 B2 | 8/2014 | Morioka | |
| 10,248,863 B2 * | 4/2019 | Ekambaram | G06V 40/20 |
| 2019/0377626 A1 * | 12/2019 | Bischoff | G05B 23/0275 |

FOREIGN PATENT DOCUMENTS

| | | | | |
|---|---|---|---|---|
| CN | 107422718 A | 12/2017 | | |
| CN | 111283731 A | 6/2020 | | |
| WO | WO-2020005164 A1 * | 1/2020 | ............ | B25J 9/1674 |

OTHER PUBLICATIONS

Anonymous, "Method and System for Self-Healing Distributed Autonomous Robots Using Collective Data Sourcing and Analytics", Published Oct. 11, 2018, 3 pages, Published by IP.com, <https://priorart.ip.com/IPCOM/000255717>.
Anonymous, "Understanding Robot Failure Thresholds", Printed May 18, 2021, 3 pages. Published by PEGA Community, <https://community.pega.com/knowledgebase/articles/pega-robot-manager/852/understanding-robot-failure-thresholds>.
Boston Dynamics, "Meet Spot, the Trusted Tool for Industrial Inspection", Published Jan. 4, 2021 by Youtube, 3 pages, <https://www.youtube.com/watch?v=vQBEwPEBMOs>.
Boston Dynamics, "Spot Launch", Published Sep. 24, 2019 by YouTube, 3 pages, <https://www.youtube.com/watch?v=wlkCQXHEgjA>.
Brennan, S., "Boston Dynamics Announces Commercial Sales of Spot Robot", Published Jun. 19, 2020 by ITPro, 12 pages, <https://www.itpro.co.uk/business-strategy/automation/356149/boston-dynamics-announces-commercial-sales-of-spot-robot>.

(Continued)

*Primary Examiner* — Joseph R Kudirka
(74) *Attorney, Agent, or Firm* — Jared L. Montanaro

(57) ABSTRACT

A processor may analyze a specific area. The processor may determine whether a threshold number of attempts to perform an action by a device has been exceeded. The processor may activate one or more scanning devices. The processor may record an attempt to perform the action. The processor may automatically provide a repair for a failure attempt. The repair may allow the device to not subsequently exceed the threshold.

20 Claims, 5 Drawing Sheets

(56) References Cited

OTHER PUBLICATIONS

Parker, L., "Alliance: An Architecture for Fault Tolerant Multi-Robot Cooperation", In IEEE Transactions on Robotics and Automation, vol. 14, No. 2, Apr. 1998: 220-240, <http://web.eecs.utk.edu/~leparker/?publications/TRA.pdf>.

Mell, et al., "The NIST Definition of Cloud Computing", Recommendations of the National Institute of Standards and Technology, U.S. Department of Commerce, Special Publication 800-145, Sep. 2011, 7 pgs.

* cited by examiner

DEVICE UNDERPERFORMANCE IDENTIFICATION AND SOLUTION

BACKGROUND

The present disclosure relates generally to the field of device maintenance, and more specifically to identification of device underperformance and an associated solution for said underperformance.

Automated and/or robotic devices are becoming more prevalent and are being used in multiple environments. One popular environment for such automated, robotic devices is an industrial floor. While on an industrial floor, automated, robotic devices typically need to grip, push, pull, lift, etc. various objects. Underperformance of the automated, robotic devices could lead to an object being moved into an undesirable location within/on the industrial floor.

SUMMARY

Embodiments of the present disclosure include a method, computer program product, and system for automatic repair of device performance. A processor may analyze a specific area. The processor may determine whether a threshold number of attempts to perform an action by a device has been exceeded. The processor may activate one or more scanning devices. The processor may record an attempt to perform the action. The processor may automatically provide a repair for a failure attempt. The repair may allow the device to not subsequently exceed the threshold.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
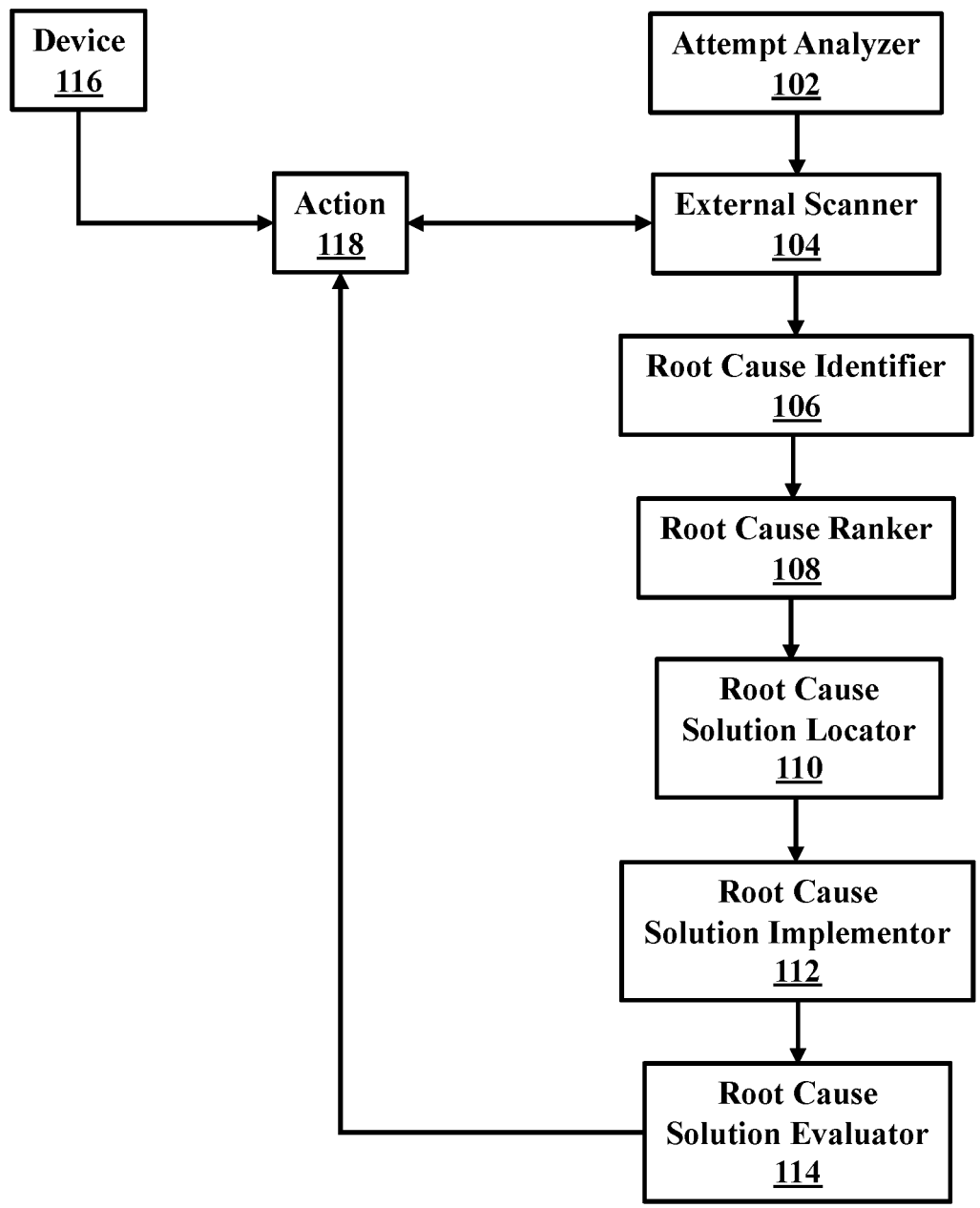
FIG. 1 illustrates a block diagram of an example system for automatic repair of device performance, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of device maintenance, and more specifically to identification of device underperformance (e.g., excess failure attempts at an action) and an associated solution (e.g., fix) for said underperformance. While the present disclosure is not necessarily limited to such applications, various aspects of the disclosure may be appreciated through a discussion of various examples using this context.

Automated and/or robotic devices are becoming more prevalent and are being used in multiple environments. One popular environment for such automated, robotic devices is an industrial floor. While on an industrial floor, automated, robotic devices typically need to grip, push, pull, lift, etc. various objects. Underperformance of the automated, robotic devices could lead to an object being moved into an undesirable location within/on the industrial floor.

As an example, the SPOT® Robot (e.g., a device, a robot, etc.) of Boston Dynamics is currently being used in various industries. The SPOT® Robot is a compact, nimble four-legged robot that can trot around an office, a home, or outdoors. It can map its environment, sense and avoid obstacles, climb stairs, and open doors. However, while performing any activity in any industrial floor, if the SPOT® Robot needs to follow the steps to perform an assigned activity against any object (e.g., including push, pull, grip, lift, roll, etc.) in the surrounding, and for some reason the SPOT® Robot is not able to perform the assigned activity with the object properly, then the SPOT® Robot will continue to try to perform the step with the object. This will result in wasted time, or the SPOT® Robot may not even be able to perform the activity with the object. In some instances, the root cause for such issues may be associated with a surrounding context, such as, water flow is pushing the material that is to be gripped, surface area is not allowing the object to move for/from a push/pull/roll/etc.; regardless the SPOT® Robot will continue to put an effort to perform the activity with/on the object.

Accordingly, disclosed herein is a solution, by which, based on a threshold number of failure attempts while performing any activity by a device (e.g., the SPOT® Robot, a robot, an automated device, etc.), the proposed solution will dynamically initiate a root cause analysis about the failure, and will be identifying if the device can perform the activity without fixing the root cause problem or if the root cause needs fixed/repaired/restored before reattempting the activity.

Before turning to the FIGS., it may be beneficial to discuss the disclosed solution in-depth. Accordingly, while performing any activity in any industrial floor (e.g., specific area), if a device (e.g., robotic system) is not able to perform an activity (e.g., grip, roll, move, etc.) for more than threshold number of attempts, then the proposed solution (via a processor) may dynamically activate required number of sensors and/or scanning devices (e.g., modules) so that a root cause analysis can be performed about the failure attempts (e.g., not being able to move the object, etc.).

The proposed solution may have/include an historical knowledge corpus (e.g., recorded from the scanning devices, via a database, etc.) about the failure attempts, identified root causes, historical number of failure attempts performed, and accordingly, for any contextual situation, the proposed solution may identify a number of failure attempts that are to be performed (e.g., a threshold number of attempts) before initiating the root cause analysis.

In some embodiments, based on the analysis of the surrounding (e.g., wires in-front of the object, not enough clearance to lift the object, etc.), the proposed solution may identify possible reasons of failure attempts by the device, and accordingly may rank the reasons (e.g., possible root causes, predicted root causes, etc.), and may identify which root causes are to be fixed before making another attempt to perform the activity.

In some embodiments, based on historical learning, and the types (e.g., software issue [device not programmed to perform an activity], hardware issue [device is missing a component to perform the activity], environmental issue [not enough room for the device to perform the activity], etc.) of identified root causes, the proposed solution may estimate how much resource (e.g., computing and/or hardware resources) and time is required to fix the root causes and may communicate the same to the ecosystem to fix the root cause.

In some embodiments, the proposed solution may identify that external resources are required to fix the possible root causes, or identify that the device can alone fix the root cause before making another attempt to perform the activity, or the device can also join in with the external resources to fix the root causes. Once the proposed solution identifies that the root cause is fixed, and the proposed solution may simulate if the device can make another attempt, and accordingly based on the simulation result, the device may reattempt to perform the activity.

In some embodiments, the proposed solution, after performing the root cause analysis and concluding on a root cause for a problem, the solution may further trigger a course correction model to identify a corrective measure and/or parameters to take into account that mitigate a failed situation/activity (e.g., failure attempt). The proposed solution may additionally perform the simulation for the above identified parameters (e.g., only one inch of clearance, simulate a gripping action, etc.) and re-program the device to react to the failure situation/attempt with a changed action (e.g., if object cannot be rolled, then grip and move object, etc.). If the simulation succeeds then further, the proposed solution may apply simulated changes in a real-time environment to continue the activity flow.

In some embodiments, the proposed solution may automatically enable a learning module on the device to fix the issues, automatically, in the future if an issue within a same context and attributes occurs. The learning module may learn the model (e.g., root cause analysis model) to empower the device to handle such situations in the future in order to fix a related issue.

In some embodiments, the proposed solution can divide the activity in such a manner that it can be achieved with the available device as well can collaborate with other devices based on their current context and availability to help fix a failure scenario (e.g., another device is called over to hold the object at one side in order to allow the first device to grip the object from an opposite side, etc.). In some embodiments, the proposed solution may keep a history log of activity performed, time taken, failure detected, type of failure, self-recovery, manual intervention, and/or what action was taken to fix the issue. In some embodiments, the proposed solution may further use the history corpus to classify failure type and/or action taken (e.g., auto-actions [device can fix itself] vs interventive-actions [another device is needed, user intervention, etc.]), to derive whether most of the issues are environmental, mechanical, and/or digital; based on said issues, corrective actions may be suggested to avoid or minimize failure situations.

Referring now to FIG. 1, illustrated a block diagram of an example system 100 for automatic repair of device performance, in accordance with aspects of the present disclosure. As depicted, system 100 includes an attempt analyzer 102, an external scanner 104, a root cause identifier 106, a root cause ranker 108, a root cause solution locator 110, a root cause solution implementor 112, a root cause solution evaluator 114, a device 116, and an action 118 (which may be performed by the device 116).

As a general example for the system 100, the device 116 may be a robotic griper that is supposed to grip an object of a weight of X kgs. The device 116 may be capable of holding that weight, and from historical data analysis, the device 116 and/or the system 100 may understand that the shape, dimensions, and weight are acceptable for the device 116 to handle. The system 100 may then turn on the external scanner 104 (e.g., camera, sensor, video recorder, etc.) and identify (via the external scanner 104) that the external surrounding is a harsh climate (e.g., high gusts of wind, downpour of rain, etc.), and the root cause identifier 106 may perform scene analysis (of the external surrounding and as based on information/a recording from the external scanner 104) and the root cause ranker 108 (with information form the root cause identifier 106) may generate weights for each identified root cause as to why an attempt at griping by the device 116 may fail.

Turning now to an in-depth example for the system 100, in any industrial floor (e.g., specific area, environment, etc.), there can be a device 116 or any other robots that are performing an action 118 (e.g., actions, activities, etc.), such as, moving material, gripping material, etc. In some embodiments, the device 116 may include its own scanning module (not depicted), where the said scanning module can recognize an object is to have the action 118 performed on.

While performing activities in/on the industrial floor, the system 100 may identify via the attempt analyzer 102 if the device 116 is able, or not able, to perform the action 118. In some embodiments, the attempt analyzer 102 may be a part of the device 116 or may utilize the external scanner 104 in order to identify if the action 118 was performed or not.

In some embodiments, the device 116 may be instructed by the system 100 and/or the attempt analyzer 102 to perform a required number of attempts at the action 118 and the action 118 may be validated if the device 116 is able to complete the action 118.

In some embodiments, during a learning process (e.g., the system 100 and or the device 116 itself may have a machine learning aspect to identify and set attempt thresholds), there can be a fixed number (e.g., threshold) of failure attempts to be allowed, and the system 100 or the device 116 itself may validate if the device 116 is able to perform the action 118. That is, if the attempt analyzer 102 identifies that a threshold number of attempts (e.g., failure attempts) at the action 118 on an object has been exceeded, the device 116 may not be validated as being able to perform the action 118, or vice-versa.

In some embodiments, the device 116 may send information to the external scanner 104, or the external scanner 104 may send the information to the root cause identifier 106, to initiate a root cause (of action 118 failure) analysis. In such an embodiment, the system 100 may communicate with external cameras, sensors, etc. (e.g., the external scanner 104) and will identify the surroundings of the industrial floor in proximity to the device 116 at that moment (e.g., the device 116 is now located next to a bottom drawer, etc.).

In some embodiments, the device 116 may perform an attempt of the action 118 under the observed surrounding (e.g., as recorded/documented by the external scanner 104), and a failure attempt may be identified/recorded. The system 100 via the root cause identifier 106 may analyze the identified/recorded failure attempt from holistic view (e.g., object is too large to grip, wind is blowing the device 116 of its axes, water has made the object slippery, etc.), and may identify a reason for the device 116 not being able to perform the action 118.

In some embodiments, identifying the reason for the device 116 not being able to perform the action 118 may include the system 100 utilizing the root cause ranker 108, which may take information (e.g., possible root causes) from the root cause identifier and rank the possible root causes based on their likelihood of causing the action 118 to fail (e.g., more likely that a slick object is causing the failure than sporadic gusts of wind, etc.). Further, the system 100 may utilize the root cause solution locator 110, which may identify/locate a solution that can be applied to alleviate the root cause. For instance, the root cause solution locator 110 may access a database with software bug fixes that could be applied to fix a software root cause, or the root cause solution locator 110 may locate another device that could perform the action 118 and call the other device over to the area where the failed attempt of the action 118 occurred, etc.

In some embodiments, if the problem is with the device 116 itself, then with digital twin simulation technology (not depicted, or included with the root cause solution implementor 112), the system 100 or the device 116 can investigate the problem, but if the problem is with the external surroundings, then the external scanner 104 may be used to analyze for a root cause.

In some embodiments, the root cause identifier 106 may analyze the images, videos, thermal camera feed, sensor feed, etc. from the external scanner 104 and may analyze why the action 118 is not able to perform by the device 116. In some embodiments, the system 100 may identify via the root cause identifier 106 possible root causes that are not allowing the device 116 to perform the action 118.

In some embodiments, the system 100 may have an historical knowledge corpus (not depicted, or included/ associated with the root cause solution locator 110) about the failure reason, and accordingly the system 100 via the root cause ranker 108 may rank the failure reasons (e.g., possible root causes). In such an embodiment, during learning processes, manual input can be provided about the reason(s), and the same can be used for learning.

In some embodiments, based on the root cause analysis (e.g., from the root cause identifier 106 and/or the root cause ranker 108), the system 100 may perform possible root causes as another action before actually trying to perform the action 118 (again). In some embodiments, the system 100 may use an historical corpus about the possible root causes and how the possible root causes are to be fixed (e.g., as found by the root cause solution locator 110).

In some embodiments, once, or before, the actual root cause(s) are fixed (via the root cause solution implementor 112), the system 100 via the root cause solution implementor 112 may simulate if the device 116 will be able to perform the action 118, and accordingly determine if another attempt at performing the action 118 can be now effectively and/or efficiently made.

In some embodiments, the system 100 may perform a cost benefit analysis associated with the cost (e.g., time, computing, etc.) of fixing the root cause(s) and performing the action 118, and the system 100 via the root cause solution evaluator 114 may determine if the action 118 can be cancelled, or performed. For instance, if the device 116 is unable to retrieve 1 of 100 objects in a multi-object group, the root cause solution evaluator 114, using the simulation, or in communication with the root cause solution implementor 112, may determine it is not worth retrieving the 1 item in order to allow another multi-object group to be retrieved.

In some embodiments, based on the simulation result as evaluated by the root cause solution evaluator 114, the system 100 via the root cause solution evaluator 114 may notify the device 116 to perform another attempt at the action 118. In some embodiments, it is noted that the root cause identifier 106, the root cause ranker 108, the root cause solution locator 110, the root cause solution implementor 112, and/or any combination of the root cause solution evaluator 114, may be generically referred to as an AI module for purposes of performing the learning process discussed throughout.

Figure 2:
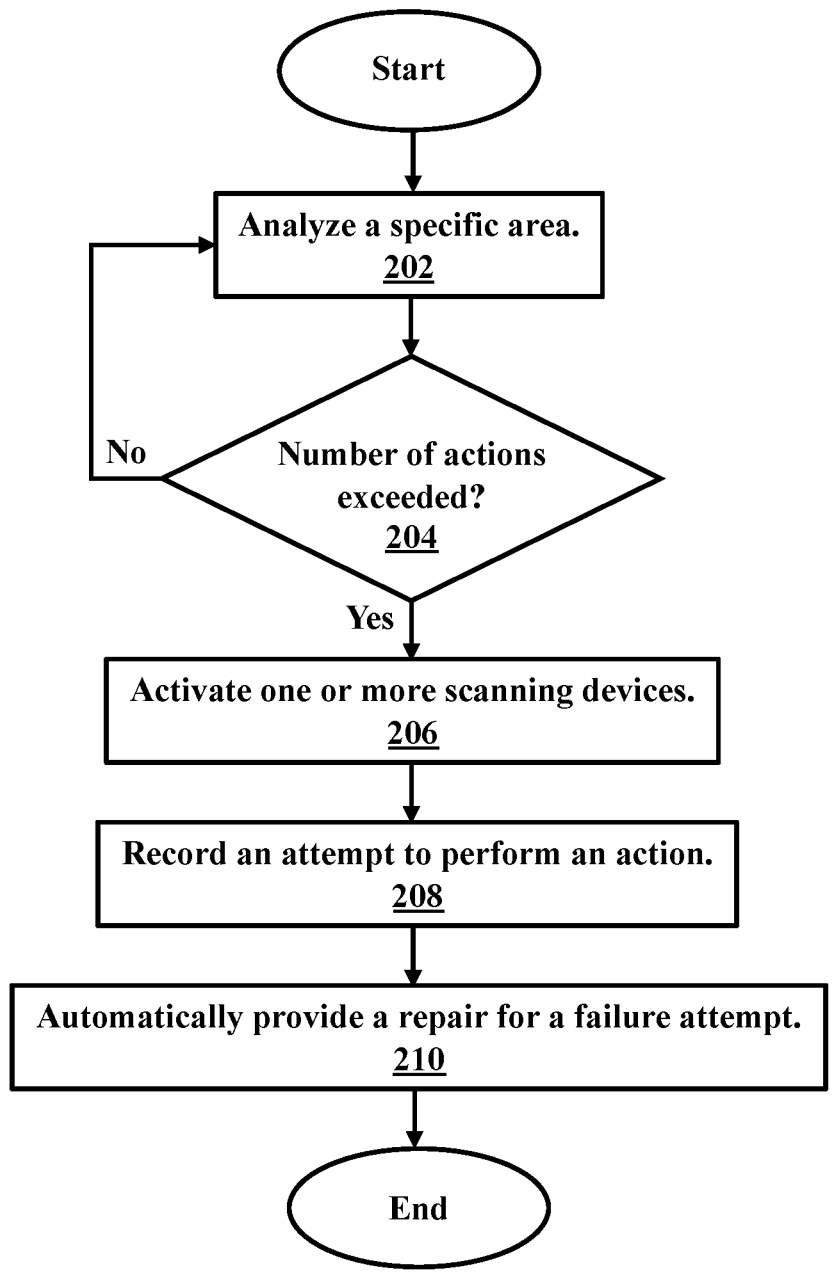
FIG. 2 illustrates a flowchart of an example method for automatic repair of device performance, in accordance with aspects of the present disclosure.

Referring now to FIG. 2, illustrated is a flowchart of an example method 200 for automatic repair of device performance, in accordance with aspects of the present disclosure. In some embodiments, the method 200 may be performed by a processor (e.g., of system 100 of FIG. 1, etc.).

In some embodiments, the method 200 begins at operation 202, where the processor analyzes a specific area (e.g., location, environment, etc.). In some embodiments, the method 200 proceeds to decision box 204, where the processor determines whether a threshold number of attempts to perform an action by a device has been exceeded.

If, at decision block 204, it is determined that the threshold number has not been exceeded, the processor may loop back to operation 202 and continue to analyze the specific area. If, at decision block 204, it is determined that the threshold number has been exceeded, the method 200 proceeds to operation 206. At operation 206, the processor activates one or more scanning devices.

In some embodiments, the method 200 proceeds to operation 208, where the processor records an attempt (of the device) to perform the action. In some embodiments, the method 200 proceeds to operation 210, where the processor automatically (based on the recording) provides a repair (e.g., fix, solution, update, etc.) for a failure attempt. The repair may allow the device to not subsequently exceed the threshold. In some embodiments, the method 200 may end.

In some embodiments, discussed below, there are one or more operations of the method 200 not depicted for the sake of brevity and which are discussed throughout this disclosure. Accordingly, in some embodiments, recording the attempt to perform the action may include the processor analyzing the recording and predicting a (possible/predicted/ etc.) root cause of a failure attempt. The root cause may be what causes the device to exceed the threshold (e.g., the device went past the object because it lost traction due to weather conditions).

In some embodiments, predicting the root cause may include the processor generating a list of root causes. The list of root causes may include the (actual) root cause and one or more other (possible) root causes. The processor may further analyze the list of root causes and prioritize the root cause and the one or more root causes. The root cause may be prioritized before the one or more other root causes.

In some embodiments, the processor (in order to help with prioritization) may estimate a resource and timing for repair of each of the root cause and the one or more other root causes. The processor may provide the resource and timing for the repair to an ecosystem in which the device is located (e.g., the processor may communicate with other devices within the specific area and indicate that it will take 20 minutes to reboot the device, accordingly, another device should cover for the device, etc.). In some embodiments, the processor may then perform the repair.

In some embodiments, the processor may generate a simulation. The simulation may replicate the action by the device with (e.g., after) the repair (e.g., can the device grab the object if the object is supported from an opposite side, etc.). In some embodiments, the processor may determine, based on the simulation, whether the repair prevents the failure attempt (or subsequent failure attempt).

In some embodiments, determining whether the repair prevents the failure attempt may include the processor identifying that the repair does prevent the failure attempt and performing the repair (in the specific area, e.g., not just in the simulation). In some embodiments, determining whether the repair prevents the failure attempt may include the processor identifying that the repair allows for the failure attempt (or subsequent failure attempts) and automatically providing a second repair for the failure attempt (e.g., stabilizing the device will still not allow the device to grip the object, accordingly, the object should be stabilized too, etc.). In some embodiments, the processor may continue to automatically provide subsequent repairs until a simulation provides that a repair will fix the root cause of the failure attempt. In some embodiments, the failed/successful simulations and/or failed/successful repairs may be stored in a corpus and used to aid the processor in finding solutions for subsequent failure attempts.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
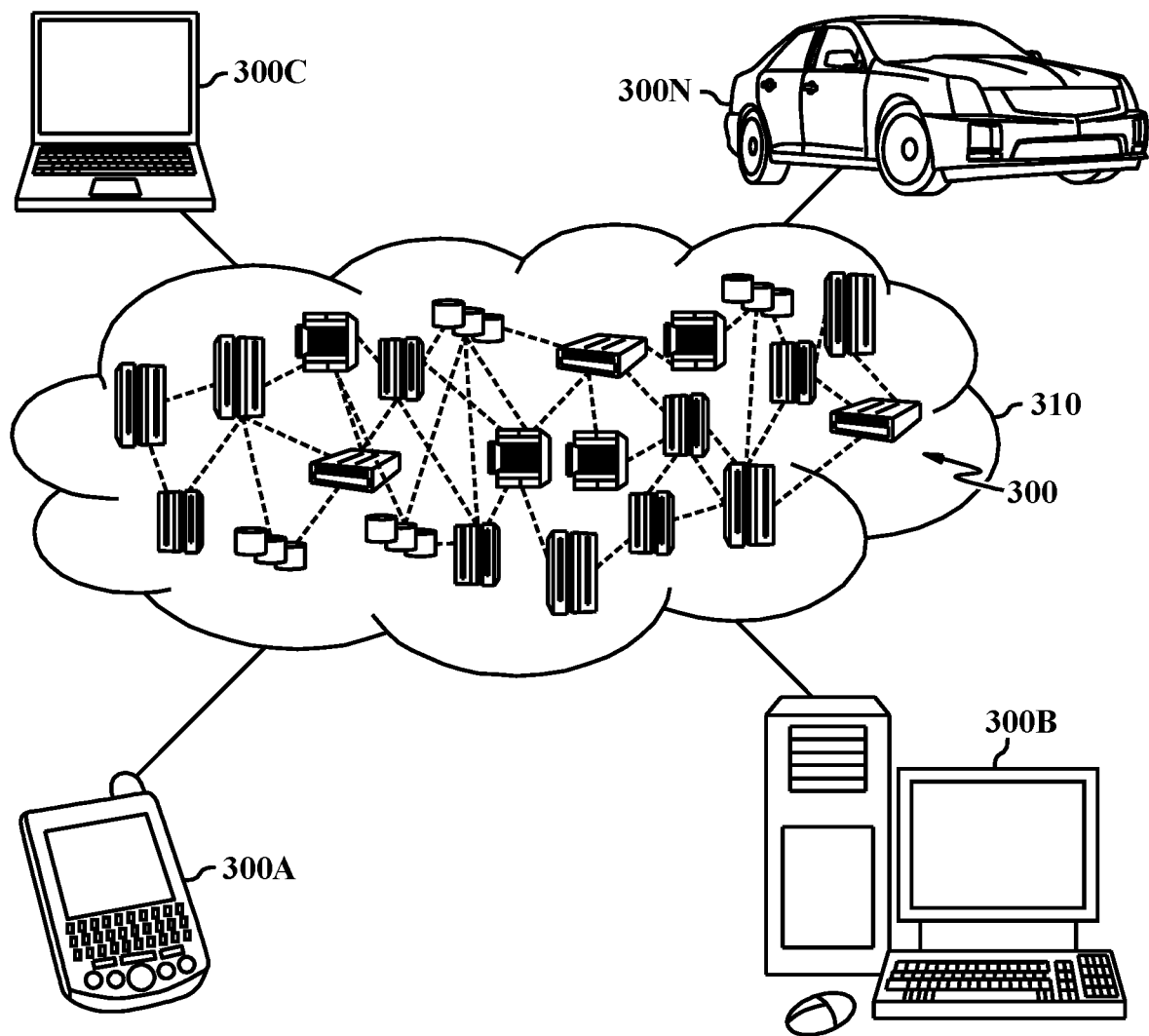
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
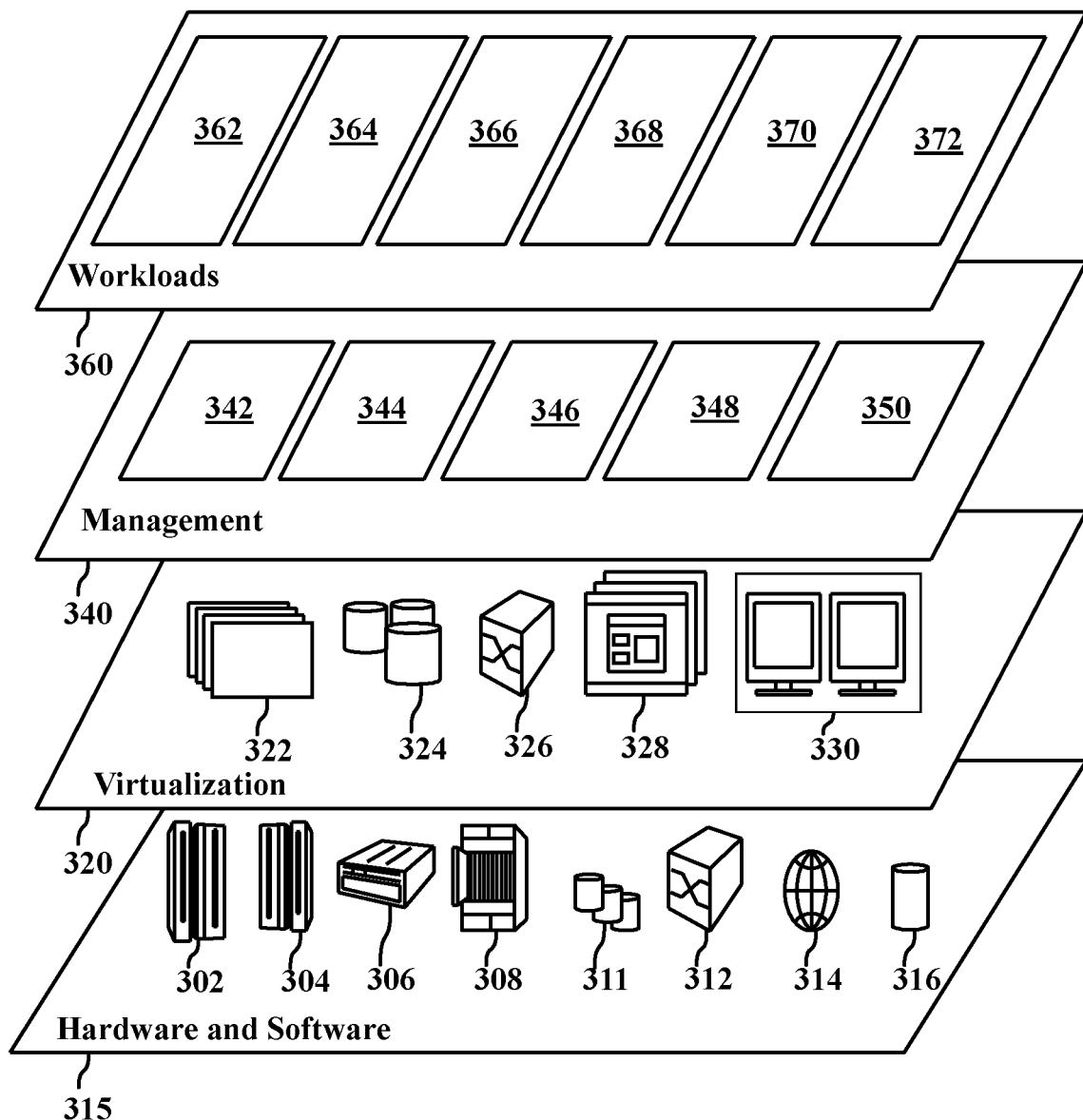
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and automatic repair of device performance 372.

Figure 4:
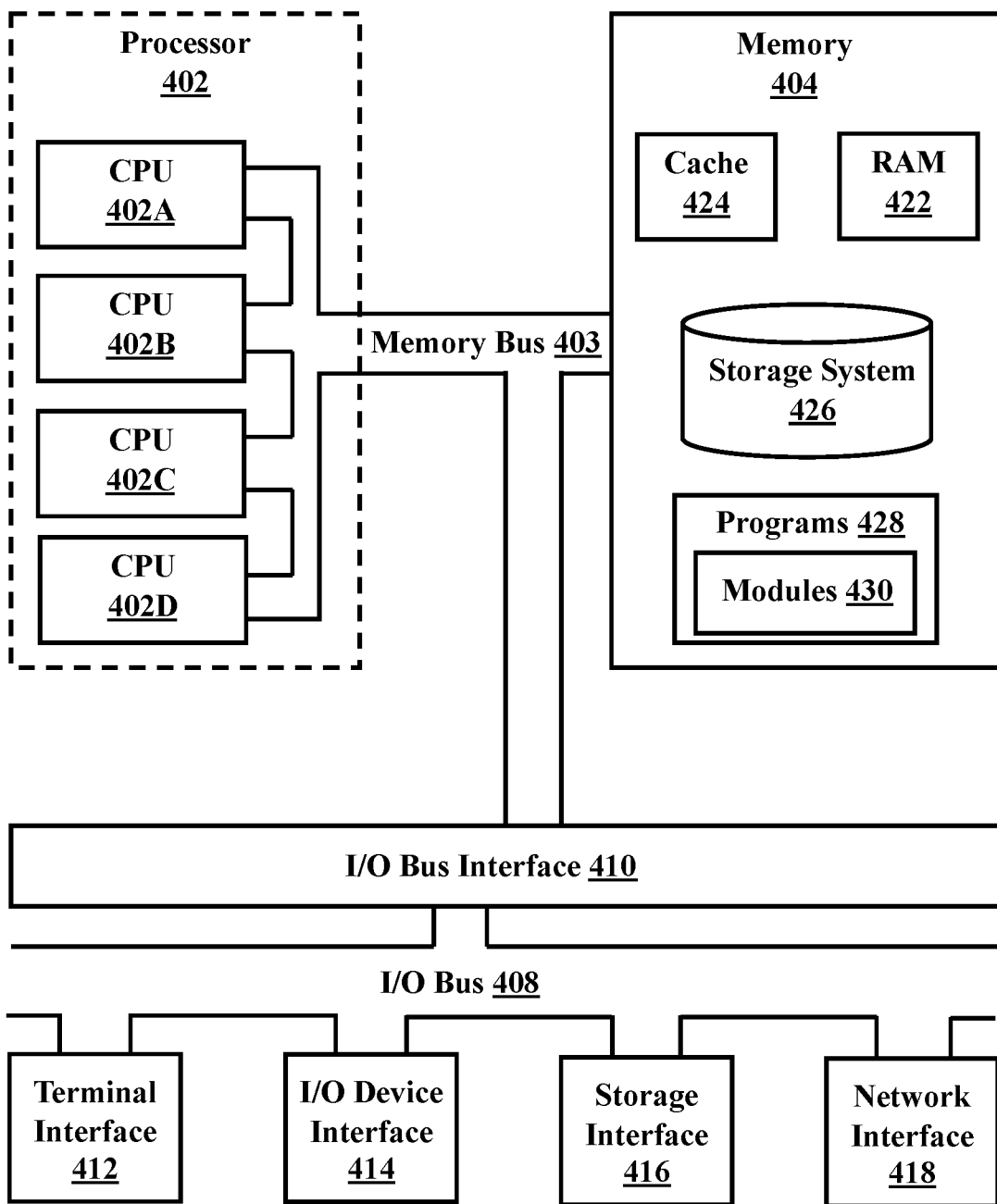
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for automatic repair of device performance, the system comprising:
   a memory; and
   a processor in communication with the memory, the processor being configured to perform operations comprising:
   analyzing a specific area;
   determining whether a threshold number of attempts to perform an action by a device has been exceeded;
   activating one or more scanning devices;
   recording an attempt to perform the action; and
   providing, automatically, a repair for a failure attempt, wherein the repair allows the device to not subsequently exceed the threshold.

2. The system of claim 1, wherein recording the attempt to perform the action includes:
   analyzing the recording; and
   predicting a root cause of a failure attempt, wherein the root cause is what causes the device to exceed the threshold.

3. The system of claim 2, wherein predicting the root cause includes:
   generating a list of root causes, wherein the list of root causes includes the root cause and one or more other root causes;
   analyzing the list of root causes; and
   prioritizing the root cause and the one or more root causes, wherein the root cause is prioritized before the one or more other root causes.

4. The system of claim 3, wherein the processor is further configured to perform operations comprising:
   estimating a resource and timing of each of the root cause and the one or more other root causes;
   providing the resource and timing for the repair to an ecosystem in which the device is located; and
   performing the repair.

5. The system of claim 1, wherein the processor is further configured to perform operations comprising:
   generating a simulation, wherein the simulation replicates the action by the device with the repair; and
   determining, based on the simulation, whether the repair prevents the failure attempt.

6. The system of claim 5, wherein determining whether the repair prevents the failure attempt includes:
   identifying that the repair does prevent the failure attempt; and
   performing the repair.

7. The system of claim 5, wherein determining whether the repair prevents the failure attempt includes:
   identifying that the repair allows for the failure attempt; and
   providing, automatically, a second repair for the failure attempt.

8. A computer-implemented method for automatic repair of device performance, the method comprising:
   analyzing, by a processor, a specific area;
   determining whether a threshold number of attempts to perform an action by a device has been exceeded;
   activating one or more scanning devices;
   recording an attempt to perform the action; and
   providing, automatically, a repair for a failure attempt, wherein the repair allows the device to not subsequently exceed the threshold.

9. The computer-implemented method of claim 8, wherein recording the attempt to perform the action includes:
   analyzing the recording; and
   predicting a root cause of a failure attempt, wherein the root cause is what causes the device to exceed the threshold.

10. The computer-implemented method of claim 9, wherein predicting the root cause includes:
    generating a list of root causes, wherein the list of root causes includes the root cause and one or more other root causes;
    analyzing the list of root causes; and
    prioritizing the root cause and the one or more root causes, wherein the root cause is prioritized before the one or more other root causes.

11. The computer-implemented method of claim 10, further comprising:
    estimating a resource and timing of each of the root cause and the one or more other root causes;
    providing the resource and timing for the repair to an ecosystem in which the device is located; and
    performing the repair.

12. The computer-implemented method of claim 8, further comprising:
    generating a simulation, wherein the simulation replicates the action by the device with the repair; and
    determining, based on the simulation, whether the repair prevents the failure attempt.

13. The computer-implemented method of claim 12, wherein determining whether the repair prevents the failure attempt includes:
   identifying that the repair does prevent the failure attempt; and
   performing the repair.

14. The computer-implemented method of claim 12, wherein determining whether the repair prevents the failure attempt includes:
   identifying that the repair allows for the failure attempt; and
   providing, automatically, a second repair for the failure attempt.

15. A computer program product for automatic repair of device performance comprising a computer readable storage medium having program instructions embodied therewith, the program instructions executable by a processor to cause the processor to perform operations, the operations comprising:
   analyzing a specific area;
   determining whether a threshold number of attempts to perform an action by a device has been exceeded;
   activating one or more scanning devices;
   recording an attempt to perform the action; and
   providing, automatically, a repair for a failure attempt, wherein the repair allows the device to not subsequently exceed the threshold.

16. The computer program product of claim 15, wherein recording the attempt to perform the action includes:
   analyzing the recording; and
   predicting a root cause of a failure attempt, wherein the root cause is what causes the device to exceed the threshold.

17. The computer program product of claim 16, wherein predicting the root cause includes:
   generating a list of root causes, wherein the list of root causes includes the root cause and one or more other root causes;
   analyzing the list of root causes; and
   prioritizing the root cause and the one or more root causes, wherein the root cause is prioritized before the one or more other root causes.

18. The computer program product of claim 17, wherein the processor is further configured to perform operations comprising:
   estimating a resource and timing of each of the root cause and the one or more other root causes;
   providing the resource and timing for the repair to an ecosystem in which the device is located; and
   performing the repair.

19. The computer program product of claim 15, wherein the processor is further configured to perform operations comprising:
   generating a simulation, wherein the simulation replicates the action by the device with the repair; and
   determining, based on the simulation, whether the repair prevents the failure attempt.

20. The computer program product of claim 19, wherein determining whether the repair prevents the failure attempt includes:
   identifying that the repair does prevent the failure attempt; and
   performing the repair.

* * * * *